United States Patent
Balsells

(10) Patent No.: US 6,749,358 B2
(45) Date of Patent: Jun. 15, 2004

(54) CONNECTOR FOR LATCHING AND CARRYING CURRENT CAPABILITIES WITH TOOLESS CONNECTION

(75) Inventor: Peter J. Balsells, Newport Beach, CA (US)

(73) Assignee: Bal Seal Engineering Co., Inc., Lake Forest, CA (US)

( * ) Notice: Subject to any disclaimer, the term of this patent is extended or adjusted under 35 U.S.C. 154(b) by 29 days.

(21) Appl. No.: 10/300,359

(22) Filed: Nov. 19, 2002

(65) Prior Publication Data

US 2003/0096526 A1 May 22, 2003

Related U.S. Application Data

(60) Provisional application No. 60/333,105, filed on Nov. 21, 2001.

(51) Int. Cl.[7] .................................................. B25G 3/00
(52) U.S. Cl. ........................ 403/316; 403/315; 403/317; 403/319; 403/326; 403/329; 403/DIG. 7; 403/DIG. 11; 439/840; 439/841
(58) Field of Search ................................. 403/315–319, 403/326, 329, DIG. 7, DIG. 11; 439/840, 841; 285/318, 321; 411/533, 541

(56) References Cited

U.S. PATENT DOCUMENTS

| | | | | |
|---|---|---|---|---|
| 2,538,683 A | * | 1/1951 | Guiler et al. ............... 285/321 |
| 2,631,633 A | * | 3/1953 | Peckham | |
| 4,632,434 A | * | 12/1986 | Proctor et al. ............... 285/318 |
| 4,678,210 A | | 7/1987 | Balsells | |
| 4,763,683 A | | 8/1988 | Carmack | |
| 4,906,109 A | * | 3/1990 | Balsells | |
| 5,082,390 A | | 1/1992 | Balsells | |
| 5,310,359 A | * | 5/1994 | Chadbourne et al. ....... 439/840 |
| 5,411,348 A | | 5/1995 | Balsells | |
| 5,545,842 A | | 8/1996 | Balsells | |
| 5,727,821 A | * | 3/1998 | Miller ........................ 285/318 |
| 5,948,983 A | * | 9/1999 | Gogol et al. | |
| 6,637,778 B2 | * | 10/2003 | Benjey | |

* cited by examiner

Primary Examiner—Lynne H. Browne
Assistant Examiner—Victor MacArthur
(74) Attorney, Agent, or Firm—Walter A. Hackler

(57) ABSTRACT

A tooless electrical connector includes a housing having a bore with a groove disposed on an inside surface of the bore with the groove establishing a shoulder between a groove bottom and a bore inside surface. A flat spring is provided and disposed in the groove for defining a spring cavity between the flat spring and the shoulder and a circular canted coil spring is disposed in the spring cavity. A pin having a circumferential groove is provided for receiving the coil spring upon insertion of the pin into the bore and a plurality of primary radial fingers formed in the flat spring retain the coil spring in the cavity before insertion of the pin. A plurality of secondary radial fingers formed in the flat spring prevent axial movement between the housing and the pin with the coil spring within the pin groove.

24 Claims, 6 Drawing Sheets

CONNECTOR FOR LATCHING AND CARRYING CURRENT CAPABILITIES WITH TOOLESS CONNECTION

This application claims the benefit of Provisional application No. 60/333,105 filed Nov. 21, 2001.

The present invention generally relates to electrical connectors and is more particularly directed to a tooless electrical connector that requires a low force to connect and a higher force to disconnect.

A variety of electrical devices utilize quick connect/disconnect connectors for conducting current from an electrical source to a lead. In general, such connectors include a housing, a spring and a lead with the current source provided by the housing. The current path is through the spring and into the lead. In order to insure positive connection, a set screw is typically used to lock the lead into the housing. This is necessary in order to provide the uniform conductivity between the lead and the housing.

While the set screw devices are functionable, they present a number of disadvantages. Specifically, due to the small size of miniconnectors, it is difficult to tighten the correspondingly very small screw. In addition, there is no structure, which provides a means for preventing over and under torquing of the set screw, which may result in an insecure coupling between the lead and the housing.

Further, if the set screw firmly holds the lead to the housing, there is no allowance for expansion, which may be caused by heating due to the conduction of electrical power, which may result in fatiguing of the lead.

Present invention provides for a tooless connection, that is, no set screw, in which the lead is positively retained in a position for insuring uniform electrical conductivity between the lead and the housing.

SUMMARY OF THE INVENTION

In one embodiment of the tooless electrical connector in accordance with the present invention a housing is provided which includes a bore with a groove disposed on an inside surface of the bore. The bore establishes a shoulder between a groove bottom and a bore inside surface.

A flat spring is disposed in the groove for defining a spring cavity between the flat spring and the shoulder and a circular canted coil spring is disposed within the spring cavity.

A pin having a tapered end and a body diameter sized for sliding engagement with the bore inside surface is provided and includes a circumferential groove in the pin body for receiving the coil spring upon insertion of the pin into the bore.

The flat spring includes a plurality of primary radial fingers formed therein which provides a means for retaining the coil spring in the cavity before insertion of the pin.

In addition, the flat spring includes a plurality of secondary radial fingers formed therein which provides a means for preventing axial movement between the housing and the pin with the coil spring within the pin groove. Preferably, the secondary fingers are shorter than the primary fingers. In addition, the primary and secondary spring fingers are preferably spaced apart from one another and extend inwardly from a common circumference.

In order to provide a large differential between connect and disconnect forces, the housing shoulder for compressing the coil spring along a minor axis thereof during disconnect of the pin from the housing bore is disposed at an angle to a normal to a conductor centerline between 5° and about 45°, preferably, about 7°.

Control of the disconnect forces is also provided by a forward shoulder of the pin grove which is disposed at an angle of between about 1° and about 90° from the conductor centerline, preferably about 90°.

A number of coil springs may be utilized in the present invention, including radial coil springs and axial coil springs.

The coil spring may be initially disposed in the cavity with a major axis disposed within an included angle of between about 30° and about 165°.

In one embodiment of the present invention, the coil spring is initially disposed in the cavity in a convex orientation and in another embodiment, the coil spring is initially disposed in the cavity in a concave orientation.

In yet another embodiment of the present invention, the flat spring comprises two spring elements, namely a first spring element comprising a plurality of primary radial fingers for retaining the coil spring in the cavity before insertion of the pin and the bore and a second spring element comprising a plurality of secondary radial fingers for preventing radial movement between the housing and the pin with the coil spring within the pin coil. In this embodiment, the primary radial fingers preferably are disposed adjacent to one another and the secondary radial fingers are in a spaced apart relationship with one another.

BRIEF DESCRIPTION OF THE DRAWINGS

The advantages and features of the present invention will be better understood by the following description when considered in conjunction with the accompanying drawings in which.

DETAILED DESCRIPTION

Figure 1:
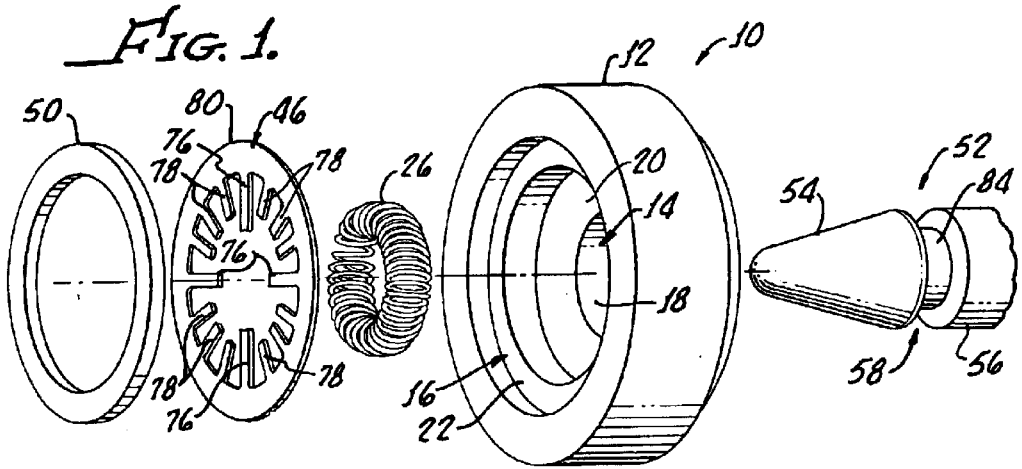
FIG. 1 is an exploded perspective view of a tooless electrical connector in accordance with the present invention generally showing a grooved pin, a grooved housing, a circular canted coil spring, a flat spring and a retainer.

With reference to FIG. 1, there is shown a tooless electrical connector 10 generally including a housing 12 having a bore 14 therethrough with a groove 16 disposed in an inside surface 18 of the bore 14 with the groove 16 establishing a shoulder 20 between a groove bottom 22 and the bore inside surface 18.

Figure 2:
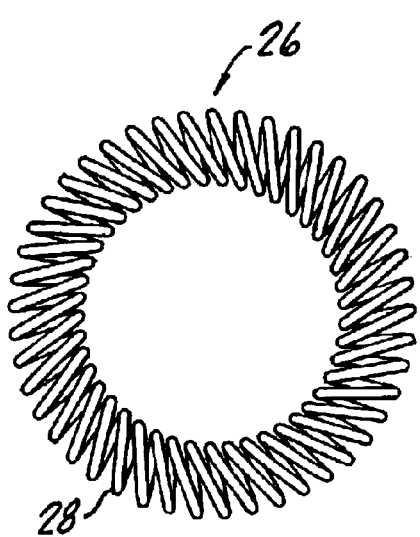
FIGS. 2–3 are front and right hand side views respectively of a radial canted coil spring for use in the present invention.
Figure 3:
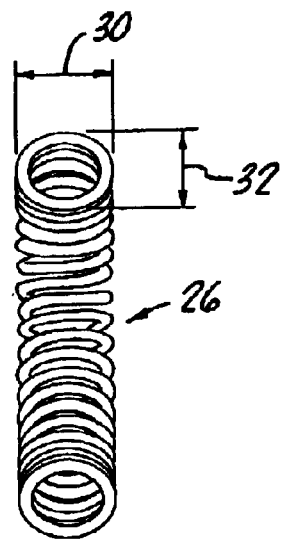

A radial coil spring 26, see also FIGS. 2–3, may be provided, which includes a plurality of inner-connected coils 28 having a coil width 30 along a major axis and a coil height 32 along a minor axis, as shown in FIG. 3.

Figure 4:
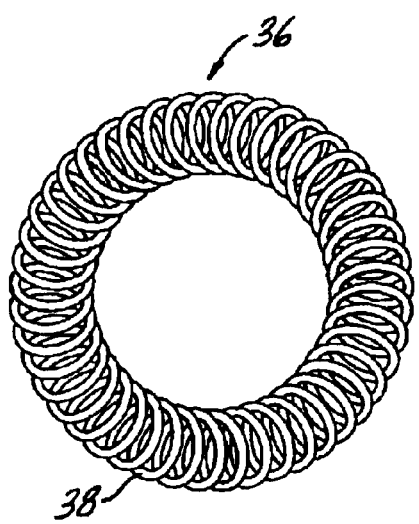
FIGS. 4 and 5 are front and right side views respectively of an axial canted coil spring suitable for use with the present invention.
Figure 5:
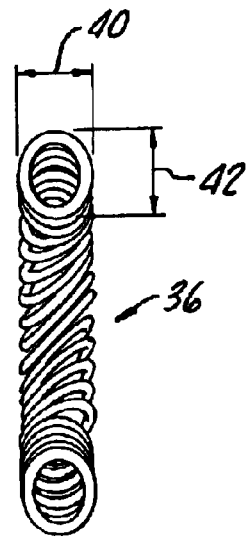

Alternatively, as hereinafter discussed in greater detail, a circular axial coil spring 36 may be utilized in accordance with the present invention as shown in FIGS. 4 and 5. As hereinafter discussed in greater detail the spring 36 has coils 38 with a coil height 40 along a minor axis and a coil width 42 along a major axis, see FIG. 5.

As also hereinafter discussed in greater detail, the radial spring 26 may be disposed in a concave or convex relationship in the housing 12 and various configurations of the springs 26, 36 may be utilized. Such springs are described in U.S. Pat. Nos. 5,139,243, 5,108,078 and 4,893,795. These patents are to be incorporated herewith in their entirety by this specific reference thereto for describing a types of springs suitable for the present invention.

With reference again to FIG. 1, a flat spring 46 is provided and disposed in the groove 16 for defining a spring cavity, see FIGS. 6–32, between the flat spring 46 and the shoulder 20. A retainer 50 secures the flat spring 46 to the housing 12 in a conventional manner, for example by press fit.

A pin 52 is provided having a tapered end 54 and a body 56, which is sized for sliding engagement with the bore inside surface 18.

A pin groove 58, in the pin body 56, receives the coil spring 26 upon insertion of the pin 52 into the bore 14.

A number of canted coil circular springs 26, 36 are suitable for the present invention. Radial springs 26, as set forth in FIGS. 6–14, are initially disposed in the groove 46 with the coil height (minor axis) 32 perpendicular to a centerline 60. A radial concave spring 64, as shown in FIGS. 15–20, may be disposed with an included turn angle A of between about 30° and about 165°, about 110° being shown in FIGS. 15–20.

In this arrangement, the coils 66 are turned away from the pin 52 insertion direction as indicated by the arrow 68.

As shown in FIGS. 21–26, a radial convex spring 70 may be disposed in the cavity at an included angle B of between about 30° and about 165°, about 110° being shown in the figures. In this embodiment, the convex of spring 70 has coils 72 turned toward the pin 52 insertion direction as indicated by the arrow 74.

The circular axial canted coil spring 36, as illustrated in FIGS. 45, may be disposed in the cavity 48 having the coils 38 turned 90° in order that loading of the coils 38 occurs along the coil width or major axis 42.

These various springs 26, 36, 64, 70 are positioned in the disconnect position by deflecting the coils 28, 38, 66, 72 along the minor axis.

With reference again to FIG. 1, the flat spring 46 includes a plurality of primary radial fingers having a length for retaining the coil spring 26 within the cavity 48 before insertion of the pin 52 and for centering the pin 52, see for example FIGS. 6, 15, 21 and 27.

Figure 11:
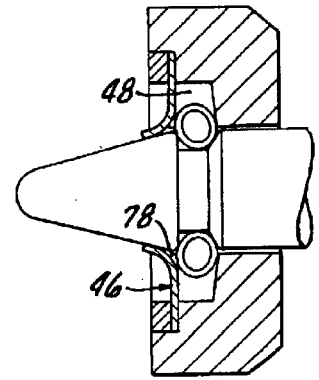
Figure 18:
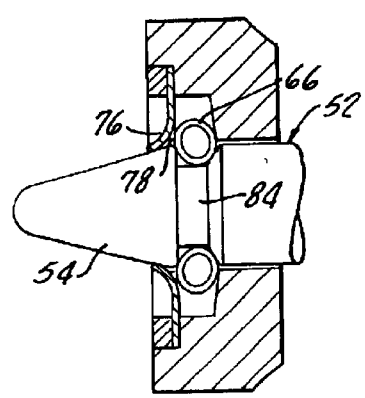
Figure 19:
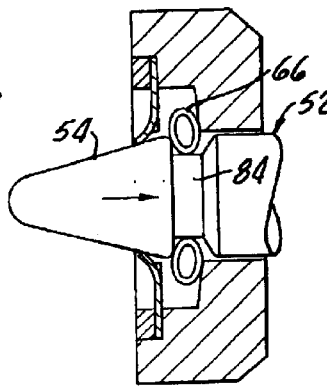
Figure 20:
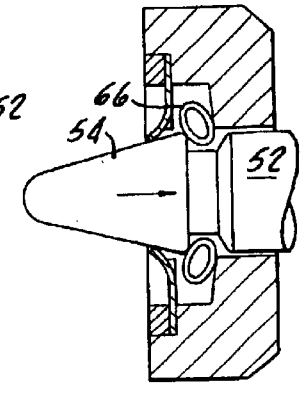
Figure 21:
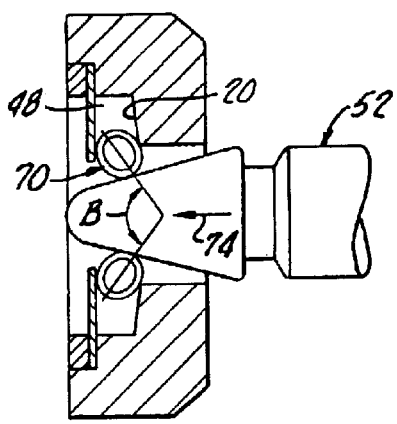
FIGS. 21–26 are cross sectional view of sequential connect/disconnect steps showing a radial spring disposed in a convex initial position within a spring cavity.
Figure 22:
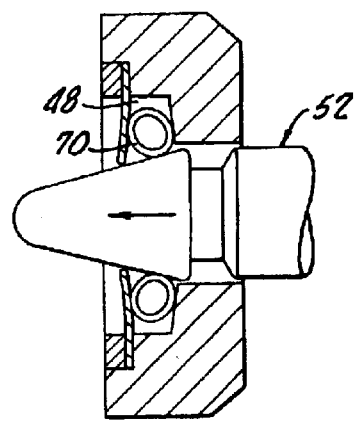
Figure 23:
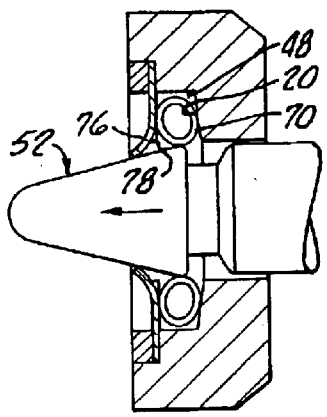
Figure 24:
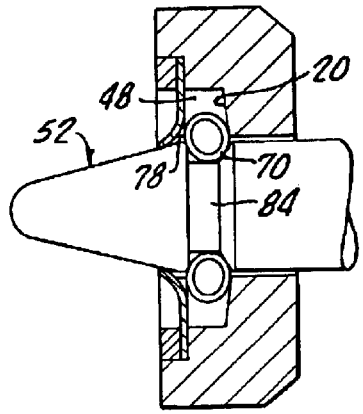
Figure 25:
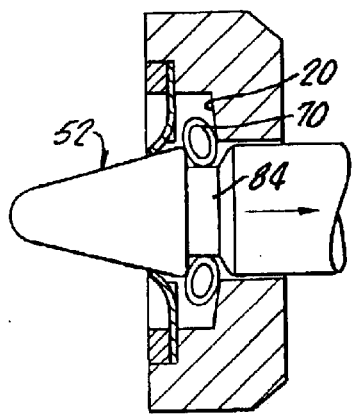
Figure 26:
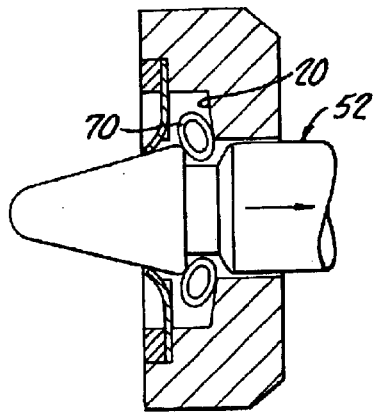
Figure 27:
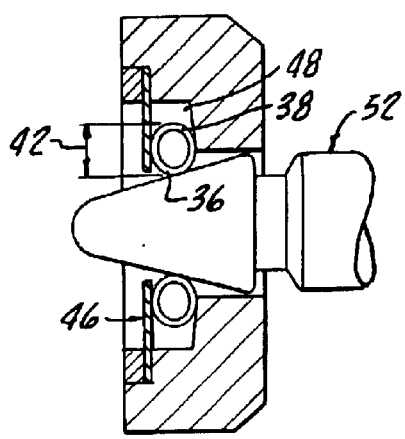
FIGS. 27–32 are cross sectional views showing sequential steps in connect and disconnect utilizing an axial spring as shown in FIGS. 4–5.
Figure 28:
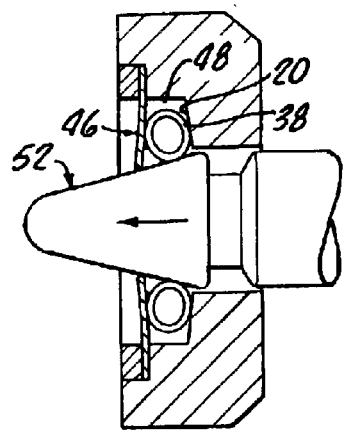
Figure 29:
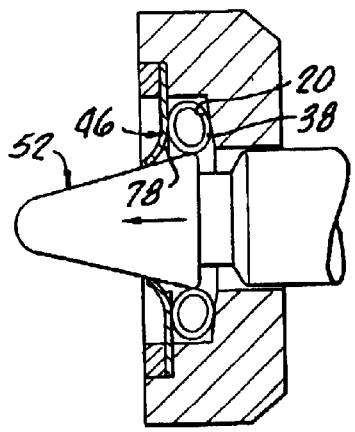
Figure 30:
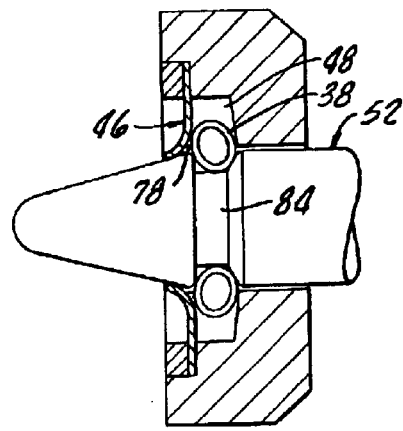
Figure 31:
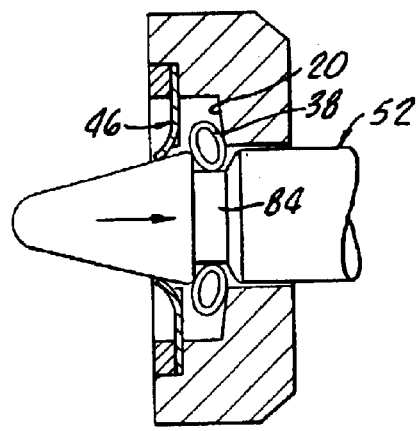
Figure 32:
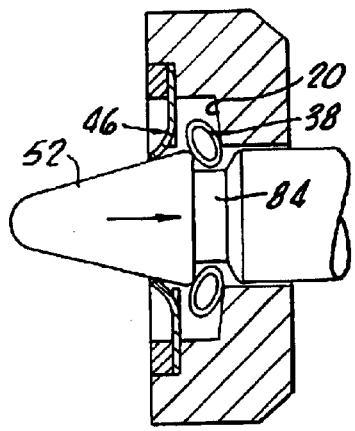

A plurality of secondary radial fingers 78, disposed in a spaced apart relationship with one another and the primary fingers 76, extend inwardly from a common circumference 80 of the flat spring 46. The secondary fingers 76 prevent axial movement between the housing 12 and the pin 52, as well as the spring 26, as is shown in FIGS. 11, 18 and 30. Common reference numbers used herein represent identical or substantially similar components in the various figures.

Because the secondary fingers 78 function to maintain positive axial location between the pin 52 and the housing 12 and the primary fingers 76 provide for centering of the pin 52 within the housing 12 undisturbed electrical conduction between the housing 12, coiled spring 38 and pin 52 is enabled. As shown, two types of fingers 76, 78 are shown, but it should be appreciated that multiple fingers (not shown) of different lengths may be used depending upon the force that is needed during radial expansion of the canted coil 38 during the connection process.

In operation, the insertion of the tapered end 54 of the pin 52 causes the coil spring 28 to deflect axially, bearing against the tapered head 54 forcing the spring 38 into the cavity 48. Further axial movement of the pin 52, as shown in FIGS. 6–14, causes the spring primary fingers 78 to deflect axially, bearing against the tapered end 54 while holding the circular spring 38 in the cavity 48.

Continued axial movement of the pin 52 causes the spring 38 to expand axially to the maximum diameter of the pin body 56 and assume an axial position. Further insertion of the pin 52 will cause the spring 38 to contract toward the pin groove bottom 84 for establishing an electrical connection between the housing 12 and the pin 52.

Figure 12:
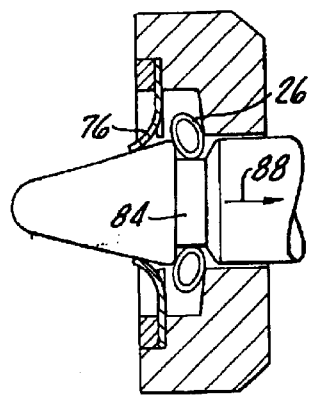
Figure 13:
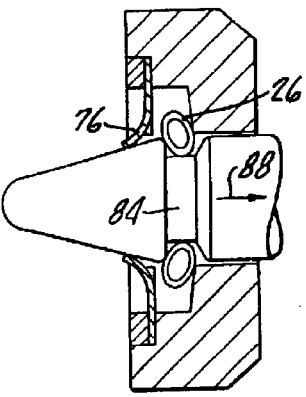
Figure 14:
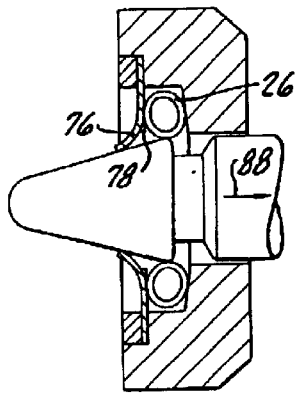
Figure 15:
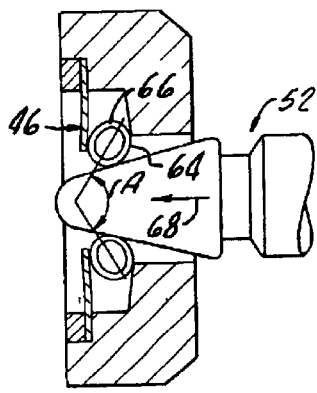
FIGS. 15–20 are cross sectional views showing sequential steps of connect and disconnect utilizing a radial spring disposed in an initial concave relationship within a spring cavity.
Figure 16:
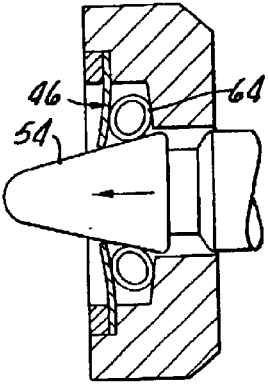
Figure 17:
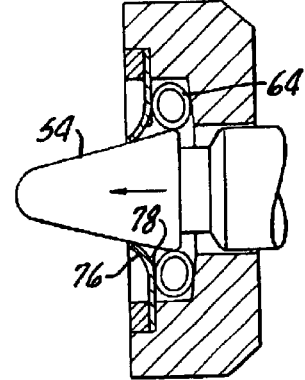

To disconnect, the pin 52 is move axially in an opposite direction, as shown by the arrows 88 in FIGS. 12–14, causing the spring 38 to deflect axially along the minor axis 32 and expand radially. Further axial movement of the pin 52 will disconnect the pin 52 from the housing 12.

As hereinabove noted, the spring can be radial, radial concave, radial convex or axial. Radial springs will require turning of the coils during the insertion procedure, while the axial spring will require only expansion of the coil during the insertion procedure.

A radial spring provides for a greater ratio of disconnect to connect forces with the ratio being highest with the radial spring followed by the radial convex spring, the radial concave spring and the lowest will be the axial spring.

The variation between the connect and disconnect forces is determined by a number of various factors, such as the initial entry angle of the tapered end 54, the load contact angle C (see FIG. 6), the release housing angle D (see also FIG. 6), the radial distance between the load point of the lead and the centerline and the coil at maximum axial deflection of disconnect, the diameter of the wire, the ratio of the coil height to the wire diameter, the back and front angles of the coil springs, spacing between the coils, spring rate (load per unit deflection), force derived by the flat finger springs during connect and retention, modulus of an elasticity of the spring wire, coefficient of friction between the spring between the spring and the release angle during disconnect, back angle of the spring at the inside diameter/outside diameter, amongst other factors.

Positive control over the ratio of connect and disconnect forces, however, can be substantially affected by control of the load contact angle C and release angle D. The shoulder 86 of the pin groove 58 establishes the load contact angle C with the groove bottom 84. The load contact angle established by the forward shoulder 86 may be between about 1° and about 90° from the centerline 60, with a 90° angle being shown.

The release angle D is formed by the shoulder 20 and may be at an angle from between about 5° and about 45° from a normal line 90 to the connector centerline 60, as shown. The shoulder, or release angle D, is preferably at an angle of about 7°.

It should be appreciated that the smaller the release angle D, the higher the force required to disconnect. In addition, an increase in the load contact angle C will cause the disconnect force to decrease.

It is important to provide a connector 10 that will have a substantial variation between connect and disconnect forces so that the pin 52 can be retained and placed within the housing 12. The higher the ratio of disconnect to connect, the greater the retention of the pin 54.

The ratio is effected by various forces during the connect and disconnect process. The force required to connect is effected by items, such as the expansion of the spring 26, the force required to turn the spring 26 while it is being expanded, the deflection of the canted coil 28 as it is being turned and expanded, the width of the cavity 48 as the spring 26 as it is being expanded, the axial force of the flat spring 46 acting on the spring 26, the release angle D, the friction between the housing 12, the flat spring 46, the canted coil spring 26, and the connecting angle of the tapered end 54, as well as the diameter of the pin 52.

The following factors affect the disconnect. The load contact angle C and the difference between the load contact angle C and the release angle D. The smaller the difference, the higher the force required to disconnect and the higher the ratio of disconnect to connect.

In addition, the position of the load point in relation to the centerline of the coil in the disconnect position is an important factor. The closer the load point is to the centerline, the higher the force required to disconnect. Further, the smaller the release angle D, the higher the force required to disconnect.

Another factor that affects the connect/disconnect force is the type of canted coil spring used, ranging from radial to angular to axial as hereinabove set forth.

The axial spring 36 develops a lower ratio of disconnect to connect primarily because it requires less force to disconnect.

Radial and angular springs 26 require more force to turn this spring to an axial position during the connect process. The ratios of disconnect to connect force vary from 1:1 to 20:1 are greater. For most applications, a ratio of 5:1 is desirable.

It should be noted that the higher the ratio of disconnect to connect force, the more difficult it is to achieve and the closer the tolerances are required to maintain the ratio.

Present description is used in connection with the very small components, for example, spring 26 having a wire diameter of 0.004 inches with a coil width of 0.0224 inches, a coil height of 0.020 inches.

With reference to FIGS. 33–37, there is shown an alternative flat spring embodiment 100 as it may be used in combination the housing 12 pin and springs 26, 38. The flat spring 100 includes a first spring element 102 having a plurality of primary radial fingers 104 for retaining the coil spring 26 in the cavity 48 before insertion of a pin 52 into the bore 14 and a second spring element 106 comprising a plurality of secondary radial fingers 108 for preventing axial movement between the housing 12 and the pin 52 with the coil spring 26 in the pin grove 58.

Figure 33:
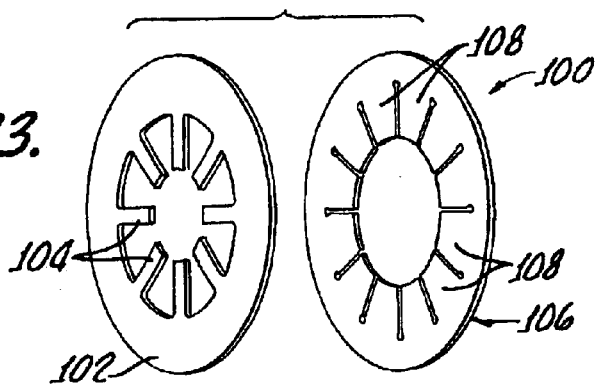
FIG. 33 is a perspective view of another embodiment of a flat spring including two spring elements.

Preferably, the primary radial fingers 104 are spaced apart from one another and the secondary radial fingers 108 are adjacent from one another, as shown in FIG. 33.

Figure 34:
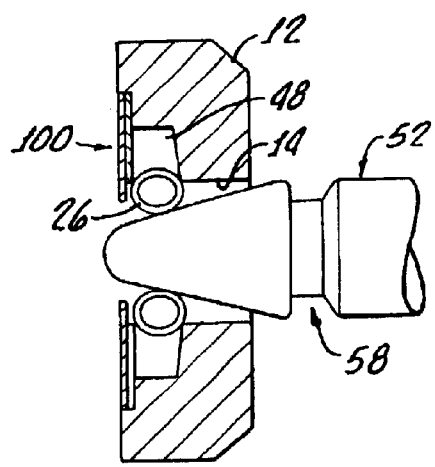
FIGS. 34–37 are cross sectional views illustrating radial, radial concave, radial convex and axial springs utilizing the flat spring illustrated in FIG. 33.
Figure 35:
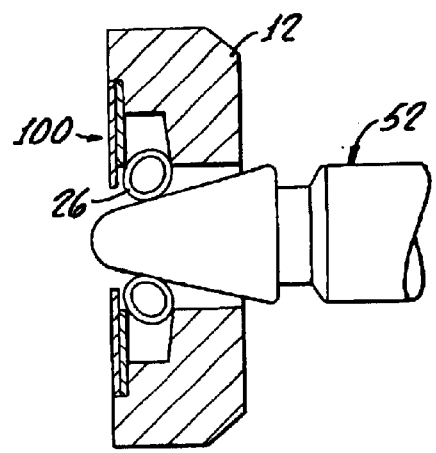
Figure 36:
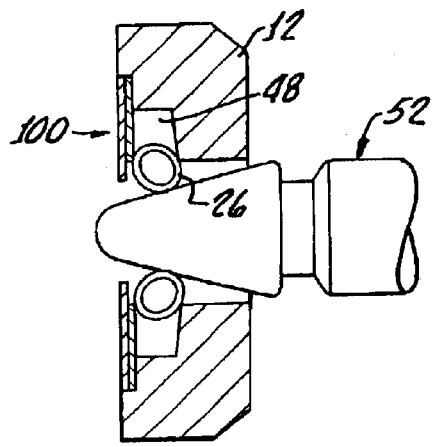
Figure 37:
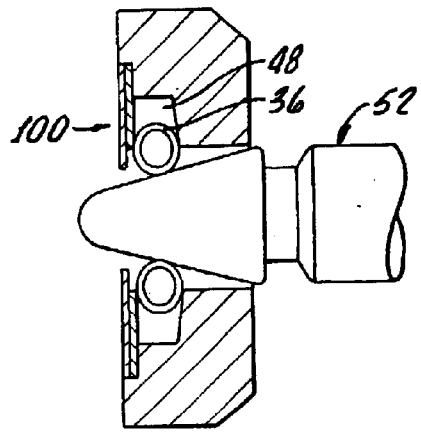

Various spring arrangements are shown in FIGS. 34–37, generally in FIG. 34, a radial spring, in FIG. 35, a concave radial spring, in FIG. 36, a convex radial spring and in FIG. 37, an axial spring. All of these spring configurations and arrangements operate in a manner, as shown in the sequential of FIGS. 6–32.

Figure 6:
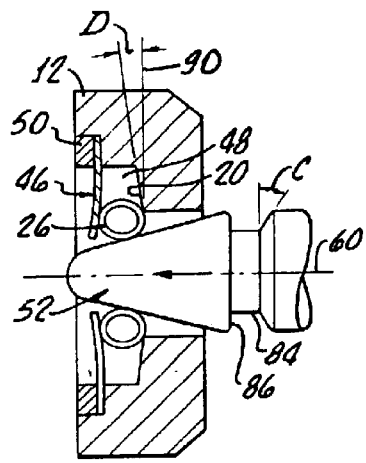
FIGS. 6–14 are cross sectional views illustrating sequential connect and disconnect positions between the pin and housing utilizing a radial spring at a 0° turn angle.

In that regard, FIG. 6 shows the radial coil spring 26 as it is retained in the housing cavity 48, just as the pin tapered in 52 is engaged for assembly.

Figure 7:
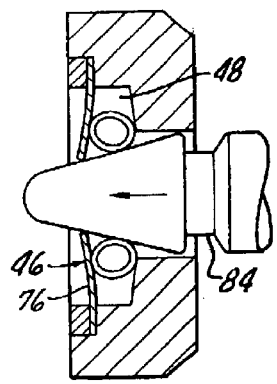

FIG. 7 shows the tapered end 54 advancing and causing the canted spring 26 to expand radially and at the same time causing the fingers 76 on the flat spring 46 to open and permit the canted spring 26 to further expand and turn axially.

Figure 8:
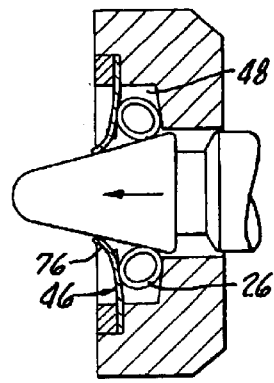

FIG. 8 shows the tapered end 54 further advanced causing the radial spring 26 to expand further and turn. At the same time, it causes the spring 26 to be slightly deflected along the minor axis of the coil 28. The amount of reflection of the spring 26 depends upon the hereinabove enumerated factors.

Figure 9:
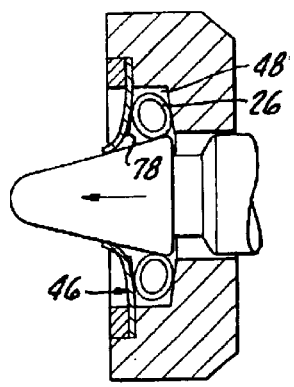

FIG. 9 shows the pin 52 in a forward motion with the spring 26 expanding radially and at the same time turning and deflecting the coil 28 slightly along the minor axis of each coil 28. At the same time, the secondary fingers 78 of the flat spring 46 retain the spring 26 in position forcing deflection of the canted coil 28.

FIG. 5 shows the spring 26 at its maximum expansion at the maximum diameter of the tapered end 52, which is equal to the diameter of the body 56. The canted spring 26 has turned and also has deflected slightly along the minor axis 32. At the same time, the primary fingers 76 have deflected slightly along the tapered end 54, while the secondary fingers 78 retain the spring 26 in position.

Figure 10:
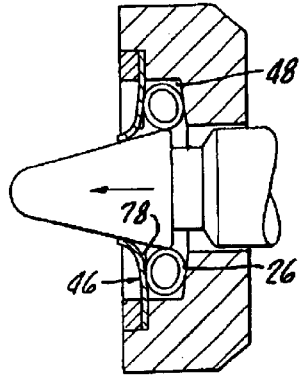

FIG. 10 shows the housing 12 and pin 52 connected, whereby the spring 26 has dropped to the bottom 84 of the pin groove 58, the primary fingers 76 in the flat spring 46 remain expanded slightly bearing on the tapered end 54 while the secondary fingers 78 come in contact with the canted spring 26.

In this position, connection has been achieved on the spring 26 touches different points along the cavity 48 and the housing 12 and in the pin groove 58, thus permitting electrical conductivity from the housing 12 to the pin 52. The secondary fingers 78 apply axial force against the canted spring 26 to minimize axial play. The amount of axial play will depend upon component tolerances and/or the amount of deflection of the spring.

FIG. 12 shows the pin 52 in an initial disconnect position whereby the canted spring 26 is deflected axially along the minor axis 32 of the coils 28 and continued axial movement of the pin 52 will cause the spring 26 to compress further and at the same time, due to the combination of the contact angle C and release angle D, will cause the spring 26 to expand radially.

FIG. 13 shows the pin 52 pressing on the canted spring 26 in a manner that it causes additional deflection of the coils 28 along the minor axis while at the same time causing the spring 26 to expand radially.

FIG. 14 shows the radial spring riding at the outside diameter of the pin 52 achieving its maximum radial expansion while at the same time allowing for the canted coils 28 to expand axially along the minor axis 32.

FIGS. 15–20 correspond to FIGS. 6–14, illustrating the movement of the radial concave spring. FIGS. 21–26 show sequential steps as hereinabove described in connection with FIGS. 14–20 illustrating the movement of a radial convex spring and FIGS. 27–32 show the sequential movement of an axial spring.

Although there has been hereinabove described a specific connector for latching and carrying current capabilities with tooless connection in accordance with the present invention for the purpose of illustrating the manner in which the invention may be used to advantage, it should be appreciated that the invention is not limited thereto. That is, the present invention may suitably comprise, consist of, or consist essentially of the recited elements. Further, the invention illustratively disclosed herein suitably may be practiced in the absence of any element which is not specifically disclose herein. Accordingly, any and all modifications, variations or equivalent arrangements which may occur to those skilled in the art, should be considered to be within the scope of the present invention as defined in the appended claims.

What is claimed is:

1. A tooless electrical connector comprising:
    a housing having a bore with a groove disposed on an inside surface of said bore, said groove establishing a shoulder between a groove bottom and bore inside surface;
    a flat spring disposed in said groove for defining a spring cavity between the flat spring and said shoulder;
    a circular canted coil spring disposed in said spring cavity;
    a pin having a tapered end and a body diameter sized for sliding engagement with the bore inside surface and having a circumferential groove in the pin body for receiving the coil spring upon insertion of the pin into the bore;
    a plurality of primary radial fingers formed in said flat spring for retaining the coil spring in the cavity before insertion of said pin; and
    a plurality of secondary radial fingers formed in said flat spring for preventing axial movement between said housing and said pin with the coil spring within the pin groove, said secondary fingers being shorter than said primary fingers.

2. The connector according to claim 1 wherein the primary and secondary spring finger are spaced apart from one another and extend inwardly from a common circumference.

3. The connector according to claim 1 wherein the shoulder is disposed at an angle to a normal to a connector centerline of between about 5° and about 45°.

4. The connector according to claim 3 wherein the shoulder is disposed at an angle of about 7° to the connector centerline.

5. The connector according to claim 1 wherein the pin groove includes a forward shoulder for comprising said coil spring along a minor axis thereof during disconnect of the pin from housing bore.

6. The connector according to claim 5 wherein said forward shoulder is disposed at an angle of between about 1° and about 90° from a normal to a connector centerline.

7. The connector according to claim 6 wherein said forward shoulder is disposed at an angle of about 90° from the normal.

8. The connector according to claim 1 wherein said coil spring is a radial coil spring.

9. The connector according to claim 1 wherein said coil spring is an axial coil spring.

10. The connector according to claim 8 wherein said coil spring is initially disposed in the cavity with a major axis disposed with an include angle of between about 30° and about 165°.

11. The connector according to claim 10 wherein said coil spring is initially disposed in the cavity in a convex orientation.

12. The connector according to claim 10 wherein said coil spring is initially disposed in the cavity in a concave orientation.

13. A tooless electrical connector comprising:
    a housing having a bore with a groove disposed on an inside surface of said bore, said groove establishing a shoulder between a groove bottom and bore inside surface;
    a flat spring disposed in said groove for defining a spring cavity between the flat spring and said shoulder;
    a circular canted coil spring disposed in said spring cavity;
    a pin having a tapered end and a body diameter sized for sliding engagement with the bore inside surface and having a circumferential groove in the pin body for receiving the coil spring upon insertion of the pin into the bore; and
    said flat spring comprising two spring elements, a first spring element comprising a plurality of primary radial fingers for retaining the coil spring in the cavity before insertion of the pin into the bore and a second spring element comprising a plurality of secondary radial fingers for preventing axial movement between said housing and said pin with the coil spring within the pin groove.

14. The connector according to claim 13 wherein the primary radial fingers are spaced apart from one another and the secondary radial fingers are adjacent one another.

15. The connector according to claim 13 wherein the shoulder is disposed at an angle to a normal to a connector centerline of between about 5° and about 45°.

16. The connector according to claim 15 wherein the shoulder is disposed at an angle of about 7° to the connector centerline.

17. The connector according to claim 13 wherein the pin groove includes a forward shoulder for comprising said coil spring along a minor axis thereof during disconnect of the pin from housing bore.

18. The connector according to claim 17 wherein said formed shoulder is disposed at an angle of between about 1° and about 90° from a normal to a connector centerline.

19. The connector according to claim 18 wherein said forward shoulder is disposed at an angle of about 90° from the normal.

20. The connector according to claim 13 wherein said coil spring is a radial coil spring.

21. The connector according to claim 13 wherein said coil spring is an axial coil spring.

22. The connector according to claim 20 wherein said coil spring is initially disposed in the cavity with a major axis disposed with an include angle of between about 30° and about 165°.

23. The connector according to claim 22 wherein said coil spring is initially disposed in the cavity in a convex orientation.

24. The connector according to claim 22 wherein said coil spring is initially disposed in the cavity in a concave orientation.

* * * * *